US008458008B2

(12) United States Patent     (10) Patent No.: US 8,458,008 B2
Dong et al.     (45) Date of Patent: Jun. 4, 2013

(54) METHOD AND APPARATUS FOR OUTLET LOCATION SELECTION USING THE MARKET REGION PARTITION AND MARGINAL INCREMENT ASSIGNMENT ALGORITHM

(75) Inventors: Jin Dong, Beijing (CN); Ta-Hsin Li, Yorktown Heights, NY (US); Jin Y. Shao, Beijing (CN); Ming Xie, Beijing (CN); Li Xia, Beijing (CN); Wen J. Yin, Beijing (CN); Bin Zhang, Beijing (CN)

(73) Assignee: International Business Machines Corporation, Armonk, NY (US)

(*) Notice: Subject to any disclaimer, the term of this patent is extended or adjusted under 35 U.S.C. 154(b) by 560 days.

(21) Appl. No.: 12/631,451

(22) Filed: Dec. 4, 2009

(65) Prior Publication Data

US 2011/0137710 A1    Jun. 9, 2011

(51) Int. Cl.
    *G06Q 10/00*       (2012.01)

(52) U.S. Cl.
    USPC .................... 705/7.33; 705/7.31; 705/7.32

(58) Field of Classification Search
    USPC .............. 705/7.11–7.42; 707/776; 706/12, 706/45
    See application file for complete search history.

(56) References Cited

U.S. PATENT DOCUMENTS

| 6,430,547 | B1* | 8/2002 | Busche et al. ............ 707/776 |
| 7,620,564 | B1* | 11/2009 | Lippock .................. 705/7.29 |
| 8,095,412 | B1* | 1/2012 | Zias et al. ................ 705/7.34 |
| 2003/0028417 | A1* | 2/2003 | Fox ........................ 705/10 |
| 2003/0033195 | A1* | 2/2003 | Bruce et al. ............... 705/10 |
| 2004/0103051 | A1* | 5/2004 | Reed et al. ................ 705/36 |
| 2007/0027745 | A1* | 2/2007 | Ouimet ..................... 705/10 |
| 2008/0243829 | A1* | 10/2008 | Liu et al. .................. 707/5 |

OTHER PUBLICATIONS

Li Xia, Yanjia Zhao, Ming Xie, Jinyan Shao, and Jin Dong "Mixed integer programming based nested partition algorithm for facility location optimization problems". IEEE International Conference on Service Operations and Logistics, and Informatics, 2008. IEEE/SOLI 2008, Oct. 12-15, 2008, pp. 2375-2381.*
Oded Berman, Dmitry Krass "The generalized maximal covering location problem" Computers & Operations Research 29 (2002) 563-581.*
Susan Hesse Owen, Mark S. Daskin "Strategic facility location: A review" European Journal of Operational Research 111 (1998) 423-447.*
Thomas A. Feo, Mauricio G.C. Resende "Greedy Randomized Adaptive Search Procedures", Journal of Global Optimization 6: 109-133 1995.*

(Continued)

*Primary Examiner* — Scott L Jarrett
*Assistant Examiner* — Alan S Miller
(74) *Attorney, Agent, or Firm* — Scully, Scott, Murphy & Presser, P.C.; Daniel P. Morris, Esq.

(57) ABSTRACT

A system and method of determining at least one location for a retail outlet in a region are described. The system and method use clustering technology for partitioning the region into a fixed number of sub-regions. Then, the system and method compute marginal increments from input data for each sub-region. The system and method choose a sub-region having a maximal marginal increment for a location of a first retail outlet.

16 Claims, 6 Drawing Sheets

OTHER PUBLICATIONS

Andreas Klose, Andreas Drexl "Facility location models for distribution system design" European Journal of Operational Research 162 (2005) 4-29.*

Ming Xie, Wenjun Yin, Jin Dong, Jinyan Shao and Lili Zhao "A Marginal Increment Assignment Algorithm for Maximal Coverage Location Problem" International Conference on Service Operations, Logistics and Informatics, 2009. SOLI '09. IEEE/Informs Jul. 22-24, 2009 651-656.*

Haldun Aytug, Cem Saydam "Solving large-scale maximum expected covering location problems by genetic algorithms: A comparative study" European Journal of Operational Research 141 (2002) 480-494.*

Al-Sultan, K. S., "A tabu search approach to the uncapacitated facility location problem", Annals of Operations Research, 1999, pp. 91-103, 86 (0).

Church, R, et al., "The maximal covering location problem", Papers in Regional Science, 1974, pp. 101-118, 32 (1).

Galvão, R. D., et al., "A comparison of Lagrangean and surrogate relaxations for the maximal covering location problem", European Journal of Operational Research, 2000, pp. 377-389, 124.

Tanonkou, G.-A, et al., Design of stochastic distribution networks using Lagrangian relaxation IEEE Transactions on Automation Science and Engineering, 2008, pp. 597-608, 5(4).

* cited by examiner

METHOD AND APPARATUS FOR OUTLET LOCATION SELECTION USING THE MARKET REGION PARTITION AND MARGINAL INCREMENT ASSIGNMENT ALGORITHM

BACKGROUND OF THE INVENTION

1. Field of the Invention

This invention relates generally to selecting a location for a retail outlet in a market region, and more particularly to a method that considers customer's accessibility for determining an optimal outlet location.

2. Description of the Related Art

Certain types of retail outlets, such as convenience stores, 7-Eleven, pharmacies, KFC food stores, bank branches, post offices, and the like are located at busy street level locations in a market region for serving residents of local communities. Customer's accessibility to such outlets may be constrained by physical barriers such as a highway, or a fence, or a river, etc., that do not relate to distance, but are factors that should be considered. These constraints should be considered when we evaluate the fitness of a location for outlets. A method for evaluating a plurality of potential sites in a given city for one or more optimal locations is a computer-intensive task, because it often involves a large number of possible locations (e.g., a city area may have about millions of candidate locations) and a large network of outlets (e.g., in some cases 100 or more outlets may need to be considered).

SUMMARY OF THE INVENTION

The present invention discloses a method for selecting one or more locations for a retail outlet such as store in a city location using a market region partition and marginal increment assignment algorithm to provide computational efficiency and optimum global results.

In an embodiment there is disclosed a method of determining at least one location for a retail outlet in a market region comprising:

partitioning the market region into a fixed number of sub-regions;

computing marginal increments from input data for each of said sub-regions; and choosing a sub-region having a maximum value among the computed marginal increments for said at least one location of said retail outlet, wherein a processor device performs one or more of: said partitioning, said computing and said choosing.

In another embodiment there is disclosed a system of determining at least one location for a retail outlet in a market region comprising:

a region partition module using partitioning the market region into a fixed number of sub-regions;

a marginal increment module computing marginal increments from input data for each of said sub-regions; and means for choosing a sub-region having a maximum value among the computed marginal increments for the at least one location of the retail outlet.

The foregoing has outlined, rather broadly, the preferred feature of the present invention so that those skilled in the art may better understand the detailed description of the invention that follows. Additional features of the invention will be described hereinafter that form the subject of the claims of the invention. Those skilled in the art should appreciate that they can readily use the conception and specific embodiment as a base for designing or modifying the structures for carrying out the same purposes of the present invention and that such other features do not depart from the spirit and scope of the invention in its broadest form.

BRIEF DESCRIPTION OF THE DRAWINGS

Other aspects, features, and advantages of the present invention will become more fully apparent from the following detailed description, the appended claims, and the accompanying drawings in which similar elements are given similar reference numerals.

DETAILED DESCRIPTION OF THE INVENTION

The selection of one or a network of optimal sites for placing a business outlet such as one or more stores in a given city can be a tedious and difficult problem to resolve. For example, the number of possible locations may be relatively large, as many as millions of possible outlet locations for a medium size city, where the number of outlets that are to be established may also be large, e.g., several dozens or more. Given an evaluation function of an outlet location, the problem of finding a number of optimal locations can be a relatively large combination problem that is difficult to solve. The brute force search is a general problem solving technique that enumerates all possible candidates for a solution and checking whether each candidate satisfies a problem's statement. For example, the brute force search to find divisor of an integer n is to enumerate all integers from 1 to n, and check whether each of them divides n without a remainder. Traditional method for determining a store location is not efficient enough. For example, an enumeration method (i.e., enumerate all the possible solutions and compare their performance, and choose the best one among them) is hard to implement because it is an NP (Nondeterministic Polynomial) problem (i.e., its complexity grows exponentially as the problem size increases). A Lagrangean method is to transform an original constrained linear programming problem to a dual problem which is a unconstrained linear programming. The dual problem can be solved by linear programming algorithm and it provides upper or lower bounds for the original problem. However, the complexity of an unconstrained linear programming grows exponentially as the problem size increases and it makes this method unsuitable for the large scale problem. A Greedy Adding algorithm is another traditional method which can be used to determine a store location. However, it is a heuristic-based method that is computationally inefficient.

As an example, a company is interested in locating 10 outlets in a certain city area where a possible number of locations in the city area will be about 1,000. If an enumeration method (i.e., a method listing all the possible solutions, judging their performance and choosing the best one among them) is used, the number of solutions for this problem is $$\binom{10}{1000},$$

which is a combination number that has a value of about $2.63*10^{23}$.

Figure 3:
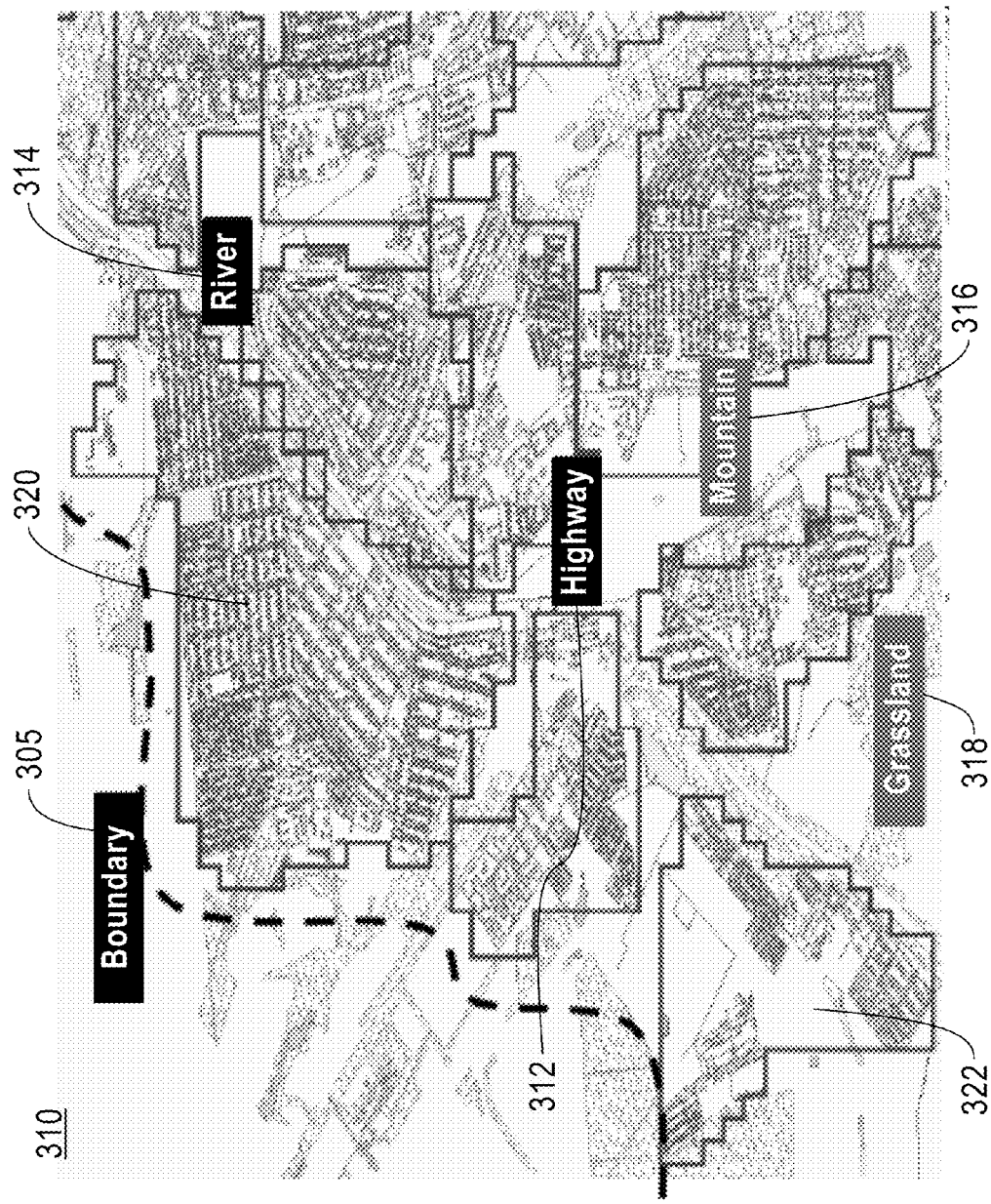
FIG. 3 illustrates a region partition according to physical barriers, customer behaviors and customer distributions in accordance with one embodiment of the present invention.

The complexity of this problem (i.e., locating 10 outlets in the certain city) is substantially reduced with a novel method described herein. As illustrated in FIG. 3, the locations of physical barriers and population distribution are obtained and used to partition the city area into sub-regions. For example, an area 310 distinguished from other area based on a boundary 305 includes a highway 312, a river 314, a mountain 316, grassland 318, a heavily populated area 320, and a lightly populated area 322. A problem of determining the locations of the outlets can be divided into, for example, 5 sub-problems by dividing the city into 5 sub-regions, where each sub-problem is directed toward determining an outlet location in a corresponding sub-region. Although the problem of assigning a correct number of outlets to each sub-region is still an undetermined problem, it is assumed, for ease of calculation, that each sub-region is assigned 2 outlets. The number of total outlet locations is also assumed to be 1,000/5=200 at each sub-region. It is known that the sub-regions are relatively independent and, therefore, a marginal increment algorithm that will be described in detail can be used to find proper locations for the outlets.

Using the marginal incremental algorithm (i.e., an algorithm run in a module 131 in FIG. 2), the number of possible solutions for the five sub-problems (one for each sub-region) is $$5*\binom{2}{200},$$

which is 99,500, a number of possible solution that is much smaller than the original value $2.63*10^{23}$. Thus, from the above, it is clear that the marginal search algorithm that one embodiment of the present invention proposes can reduce the complexity of the problem (i.e., a problem determining 10 outlet locations in a city).

Figure 1:
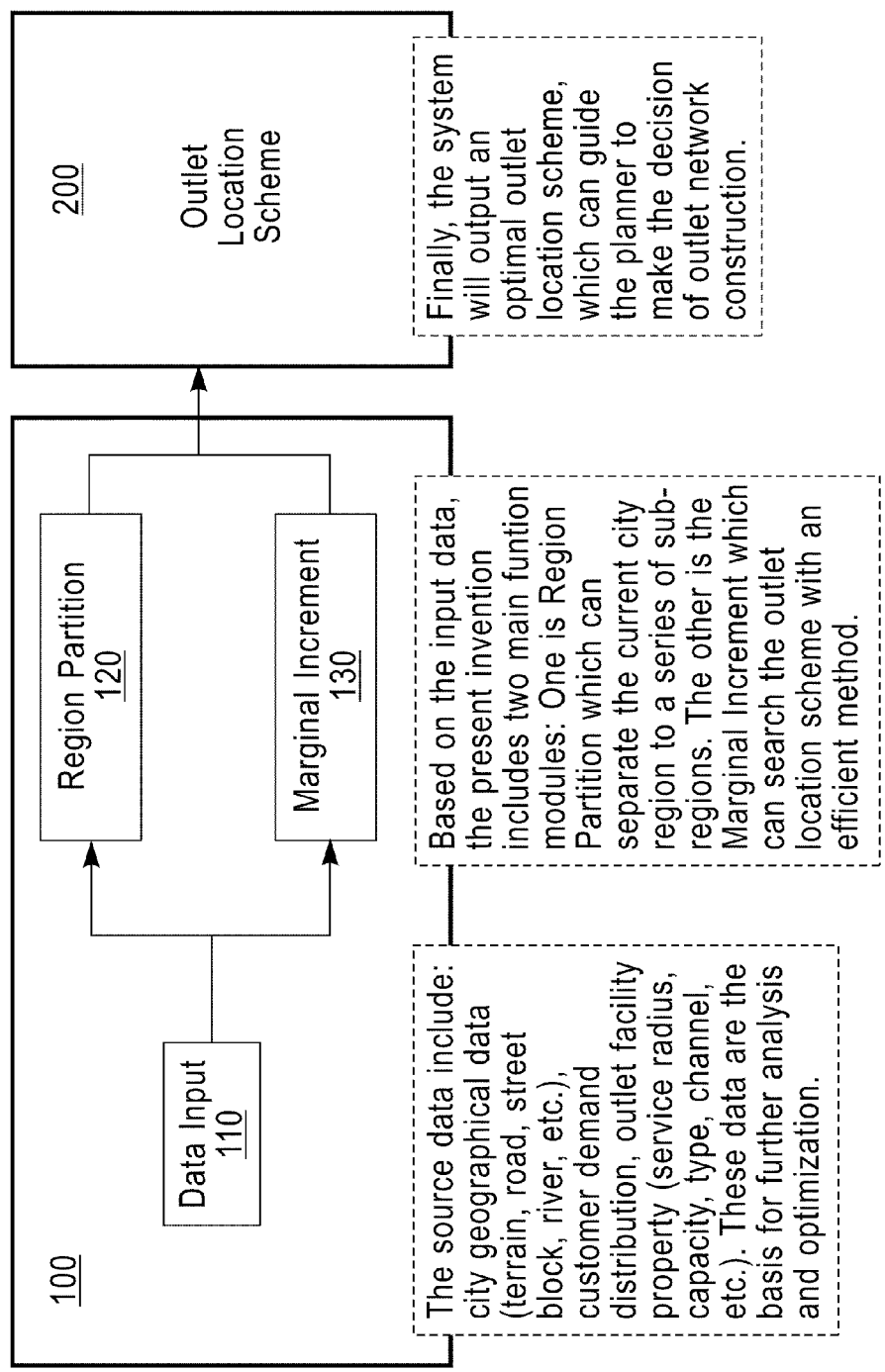
FIG. 1 illustrates a system diagram for determining a store location in accordance with one embodiment of the present invention.
Figure 2:
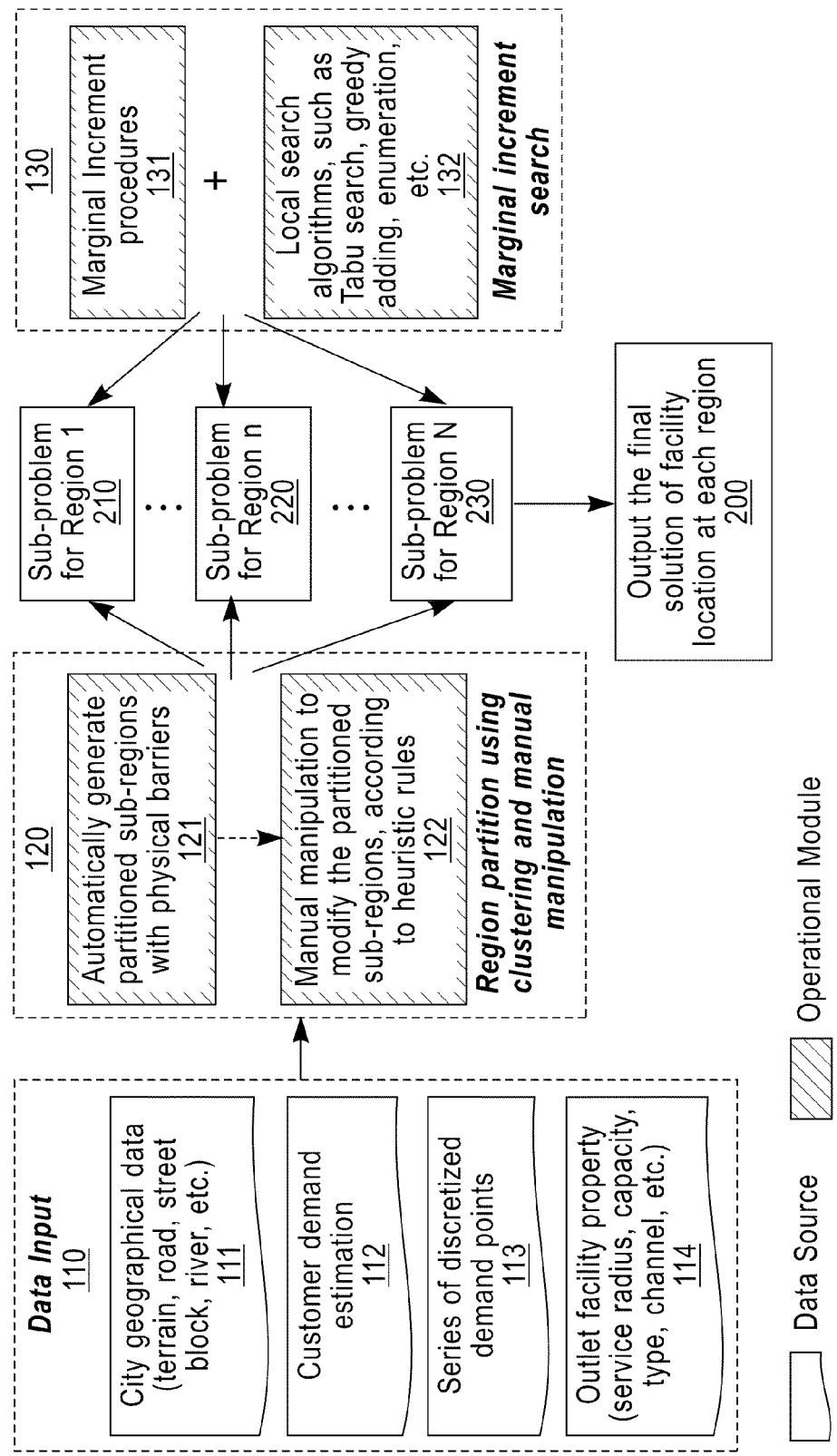
FIG. 2 illustrates a detailed system diagram for determining a store location in accordance with one embodiment of the present invention.

Referring to FIGS. 1 and 2, there are shown an exemplary embodiment of a method of the present invention that utilizes, as input data, geographical data (e.g., locations of mountains), customer demand estimation (e.g., the number of daily potential customer) and, outlet facility property (e.g., a necessary area of the facility). First, a city region is partitioned into a series of sub-regions according to the input data. The sub-regions are independent and the input data is specific for each of the sub-regions. A problem of locating the outlets in the city region is considered by dividing the problem into a series of sub-problems (e.g., sub-problems locating the outlets each sub-region). For each sub-region, the proper number of outlets and the locations for these outlets is determined, e.g., by running the marginal increment algorithm. The marginal increment algorithm utilizes the independence of sub-regions and substantially reduces search complexity as described above. A solution of the marginal increment algorithm is a global optimum if market demand is self-contained within the sub-regions.

Referring to FIG. 1, there are provided two modules 100 and 200. A first module 100 includes three modules, data input module 110, region partition module 120, and marginal increment module 130. The data input module 110 obtains the input data such as city geographical data, customer data and outlet facility property. For example, the data input module 110 obtains the geographical data from a geographical information system (GIS) such as Google® Earth. The data input module may obtain the customer data from a database in a government agency such as IRS (Internal Revenue Service). The data input module 110 may obtain the outlet facility property from a database associated with the outlet facility. The input data module 110 provides the input data to the region partition module 120 and the margin increment module 130 for further analysis and optimization.

The region partition module 120 separates the city region to a series of sub-regions according to the input data, e.g., by utilizing a clustering algorithm (e.g. the well-known k-means clustering algorithm, which aims to partition n points into k clusters, in which each observation belongs to the cluster with the nearest mean). The marginal increment module 130 searches an outlet location by running the marginal increment algorithm. The second module 200 is an outlet location scheme module which outputs an outlet location distribution in a city region through a display.

Referring to FIG. 2, the data input module 110 receives the input data such as city geographical data such as terrain, road, street block, river, etc. 111, customer demand distribution 112, discrete demand points 113, and outlet facility property such as service radius, capacity, type, channel, etc. 114. The City Geographical Data 111 is organized as a digital library or document which is stored in a computer on a Geography Information System (GSI) platform. The Customer Demand Estimation 112 is a demand of customers on the outlet facility and is assumed as known data (i.e., pre-existing data). From the customer demand estimation 112, the data input module 110 obtains a distribution of customer demand in the city region. Series of Discrete Demand Points 113 is a series of discrete customer demand points which allows customer demand estimation 112 to be handled more easily. Outlet Facility Property 114 mainly includes information about the outlet facilities, such as the service radius, capacity, type, route, etc.

The region partition module 120 includes at least two modules: a partitioning module 121 and a manual manipulation module 122. The partitioning module 121 automatically generates partitioned sub-regions according to the input data such as the physical barriers and customer or population distributions, e.g., by utilizing clustering or classifying algorithm in a pattern recognition field. The manual manipulation module 122 allows a user to perform a manual manipulation on the automatically partitioned sub-regions. The manual manipulation module 122 can adjust the generated sub-regions according to the users' common sense and some heuristic rules. The heuristic rules are primarily directed to regular customer behavior and outlet facility service characteristics. For example, the heuristic rule can be that a whole residence area should not be divided into different sub-regions, and sub-region partitions should be accordance with the main roads distribution when we are handling with the gas stations location problem.

The marginal increment module 130 includes at least two modules: a marginal increment procedure (MIP) module 131 and a local search module 132. The MIP module 131 runs the marginal increment algorithm that will be described in detail. The local search module 132 runs a local search algorithm such as Tabu search (Tabu search maintains a Tabu list to record the recent used search directions and void the search efforts are confined in current search directions. It can improve the algorithm's optimization capability through expanding the search breadth), greedy adding (Greedy adding is to find the outlets locations one by one, i.e., step1 is to find the best location for the first outlet, step2 is to find the best location for the second outlet while the previous outlet locations are fixed, iterate with the similar way until find all the outlets locations), enumeration, etc. Al-Sultan, et al. "A tabu search approach to the uncapacitated facility location problem", Annals of Operations Research 86 (0), pages 91-103, wholly incorporated by reference as if fully set forth herein, describes the Tabu search in detail. Velle, et al., "The maximal covering location problem", Papers in Regional Science 32(1), pages 101-118, 1974, wholly incorporated by reference as if fully set forth herein, describes the Greedy adding in detail. The local search module 312 can help the MIP module 131 searches for possible locations of outlets at each sub-region and calculates a value of marginal increments.

As illustrated in FIG. 2, the region partition module 120 outputs a sub-problem for each partitioned region such as a sub-problem for Region 1 (210), a sub-problem for Region n (220) and a sub-problem for Region N (230). According to one embodiment of the present invention, the sub-problem may includes, but is not limited to: determining an outlet location in each partitioned region. The marginal increment module 130 runs the marginal increment algorithm on each sub-problem for each partitioned region to find an outlet location in each partitioned region. The second module 200 then outputs the found outlet location in each partitioned region.

As illustrated in FIG. 3, physical barriers include, but are not limited to: a river 314, a mountain 316, a highway 312, grassland 318, etc. These physical barriers can be considered to be obstacles which make it difficult for a customer to move from one sub-region to another sub-region. Thus, the whole region, the city, is partitioned into sub-regions, as shown in FIG. 3, where customers at one sub-region will get the service of outlets that are located only in the same sub-region.

The marginal increment algorithm is a search algorithm that utilizes the outlet facility property and region partitions. An outlet location selection problem can be viewed as a Maximal Covering Location Problems (MCLP) problem.

In an MCLP problem, a whole location place, a city or a country, contains a series of customer demand points where the total number of customer demand points is N, which can also be viewed as a series of customer locations. A customer demand at point i (i=1, 2, . . . , n), herein referred to as a business potential, is denoted as p(i). The total number of outlets that are to be located in the city is denoted as m. Each outlet is located at a point with a covering range defined as a circle with a radius r. Thus, a coverage area, also called trading area, of an outlet j is denoted as $R_j$. The covered business potential by outlet j can be denoted as $$g(j) = \sum_{i \in R_j} p(i).$$

A problem that is to be solved herewith is where should the m outlet facilities be located to maximize the sum of business potential that is covered by the outlet facilities.

According to one embodiment of the present invention, a method for obtaining an answer to the problem is here referred to as Marginal Increment Algorithm. After the region partition module 120 is used, the whole location space, the city, is divided into L small separate sub-regions. The problem now is how the total m number of outlet facilities should be distributed among the different sub-regions to maximize the total covered business potential. The marginal increment algorithm here disclosed is used to solve this problem.

To obtain a solution to the problem, let $A_1, A_2, \ldots, A_L$ denote the L sub-regions. Now, suppose a maximal covered business potential in a sub-region $A_i$ is $f(A_i, k)$, if k facilities is assigned to the sub-region $A_i$. The value of $f(A_i, k)$ can be obtained by running a local search algorithm which is processed by the module 132. For example, we use the enumeration method to obtain the value of $f(A_i, k)$, i.e., enumerate all the possible locations for k outlets and calculate the covered business potential $$g(j) = \sum_{i \in R_j} p(i)$$

of each outlet, and then choose the outlet distribution scheme which has the largest sum of its g(j)s. Based on $f(A_i, k)$, the marginal increment of $A_i$ containing k facilities is defined as $d(A_i, k+1) = f(A_i, k+1) - f(A_i, k)$, where $d(A_i, k+1)$ represents a score increment, when increasing the number of outlets from k to k+1 in the sub-region $A_i$. Then the marginal increment algorithm of a facility assignment can be described as follows:

Marginal Increment Algorithm

Let $(m_1, m_2, \ldots, m_L)$ denote the number of outlet facilities assigned to sub-regions $A_1, A_2, \ldots, A_L$.

Step 1: Set $m_1 = m_2 = \ldots = m_L = 0$

Step 2: For k=1 to m

Step 2.1: Compute the marginal increment $d(A_i, m_i+1)$ for each sub-region

Step 2.2: Get the maximal marginal increment $d_{max}$ and its corresponding sub-region index $i_{max}$. If there is more than one marginal increment that equals $d_{max}$, take a sub-region that contains minimal outlet facilities.

Step 2.3: Set $m_{i_{max}} = m_{i_{max}} + 1$

Step 3: Output $(m_1, m_2, \ldots, m_L)$

A basic idea of the above algorithm is to assign outlet facilities one by one, each time to the sub-region that has a maximal marginal increment value. This algorithm is both easy to implement and optimal when customer demand is self-contained within each sub-region.

Figure 4:
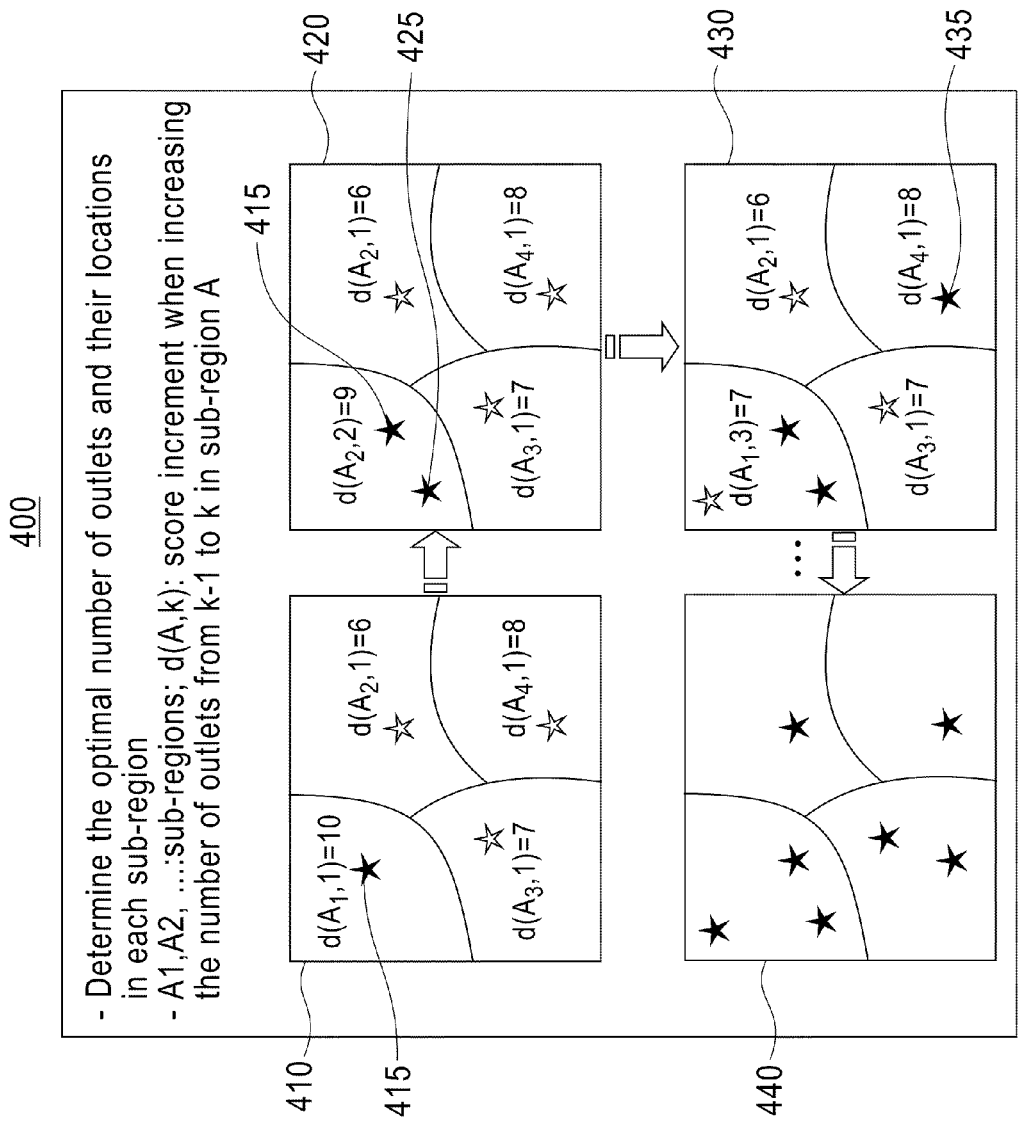
FIG. 4 illustrates an exemplary embodiment of running marginal increment procedure in accordance with one embodiment of the present invention.

To understand the marginal increment algorithm, a following simple example is provided. Referring to FIG. 4, a city area is divided into 4 sub-regions, e.g., by running the module 120, where 7 outlets are assigned to these 4 sub-regions to obtain a maximal business potential coverage. According to Step 2.1 of the marginal increment algorithm noted above, a value of $d(A_i, 1)$ for each sub-region $A_i$ is first calculated. Also, the best location for the current one outlet is determined during the calculation process of $d(A_i, 1)$. These values can be obtained by a local search algorithm (e.g., Tabu search, greedy adding, enumeration, etc.) run in the module 132 of FIG. 2. For example, with respect to the calculation of $d(A_i, 1)$, we use the enumeration method to compare the g(j) of each possible location j in sub-region $A_i$ and choose the location j* with the largest g(j) among all the possible locations of sub-region $A_i$. Thus, the location j* is found for the current best outlet location (e.g., 'star's of 410 in FIG. 4) and the related score increment $d(A_i, 1)$ is obtained as $d(A_i, 1)=f(A_i, 1)-f(A_i, 0)=f(A_i, 1)-0=g(j^*)$. As illustrated by a sub-FIG. 410 in FIG. 4, $d(A_1,1)=10$, $d(A_2,1)=6$, $d(A_3,1)$ and $d(A_4,1)=8$ is obtained, e.g., by processing the Step 2.1. According to Step 2.2, the maximal marginal increment, which is $d_{max}=d(A_1,1)$, is chosen and the sub-region index $i_{max}$ is 1. Therefore, at this stage, the first outlet is assigned to a sub-region 1 and located at a location marked by a star 415 in the sub-FIG. 410. At the second stage, Step 2 is repeated and a value of $d(A_1,2)$ is recalculated, where the values of $d(A_2,1)$, $d(A_3,1)$, and $d(A_4,1)$ are known from the previous stage. The marginal increment values are again compared and the maximal one is chosen. At this stage, $d_{max}=d(A_1,2)$ and the sub-region index $i_{max}$ is still 1. Therefore, the second outlet is assigned to the sub-region 1 and located at a location marked by a star 425 in the sub-FIG. 420. At the third stage, this algorithm is repeated from Step 2 and the value of $d(A_1,3)$ is calculated. The values of the marginal increments are again compared and the maximal one is chosen. At this stage, $d_{max}=d(A_4,1)$ and the sub-region index $i_{max}$ is 4. Thus, the third outlet is assigned at sub-region 4 and is located at a location marked by a star 435 in a sub-FIG. 430. These steps are repeated until all of the 7 outlets are assigned at the sub-regions. Finally, the outlet locations are obtained as illustrated by the stars in a sub-FIG. 440. The above is an example which demonstrates processing of the marginal increment algorithm to find outlet locations in a region or sub-region.

The local search algorithms, such as Tabu search, greedy adding, enumeration, etc. help function 131 search for possible locations of outlets at each sub-region and calculate a value of the marginal increment $d(A_i,k+1)$.

Figure 5B:
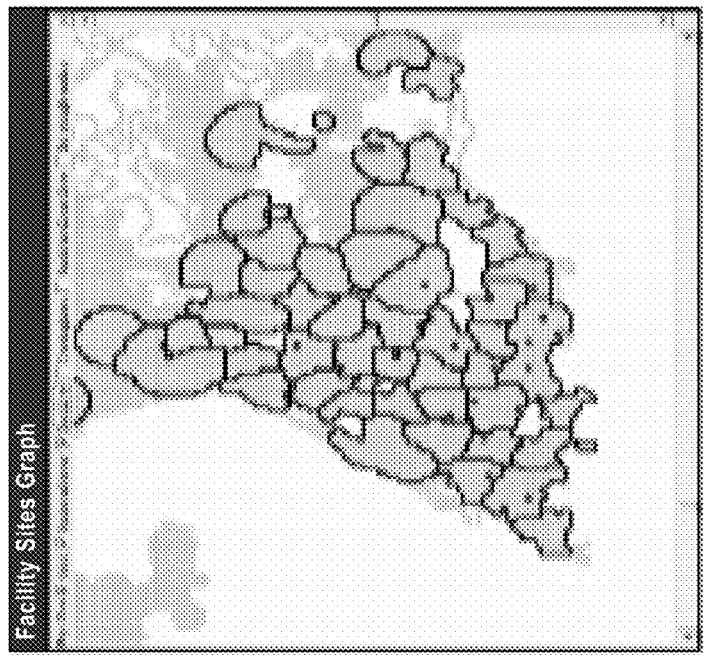
FIGS. 5A-5B illustrate implementations of two functions: a market region partition and a marginal increment assignment search algorithm in accordance with one embodiment of the invention.
Figure 5A:
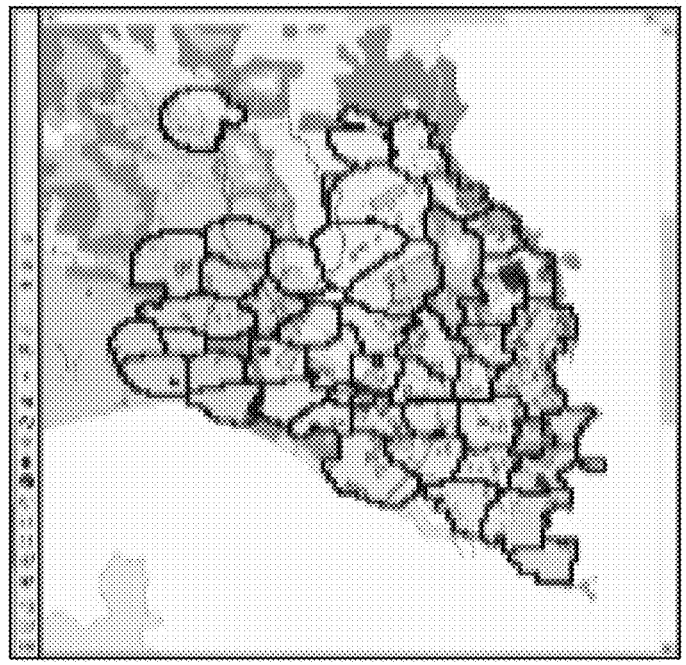

FIG. 5A illustrates an exemplary software implementation of the region partition module 120 according to one embodiment of the present invention. The various irregular areas 510 are divided into sub-regions which are generated automatically by the module 120.

FIG. 5B illustrates an exemplary software implementation of the module 130 according to one embodiment of the present invention. Based on the divided sub-regions, the modules 131 and 132 are uses to calculate outlet locations. The dots in the sub-regions designate locations of outlets.

Figure 6:
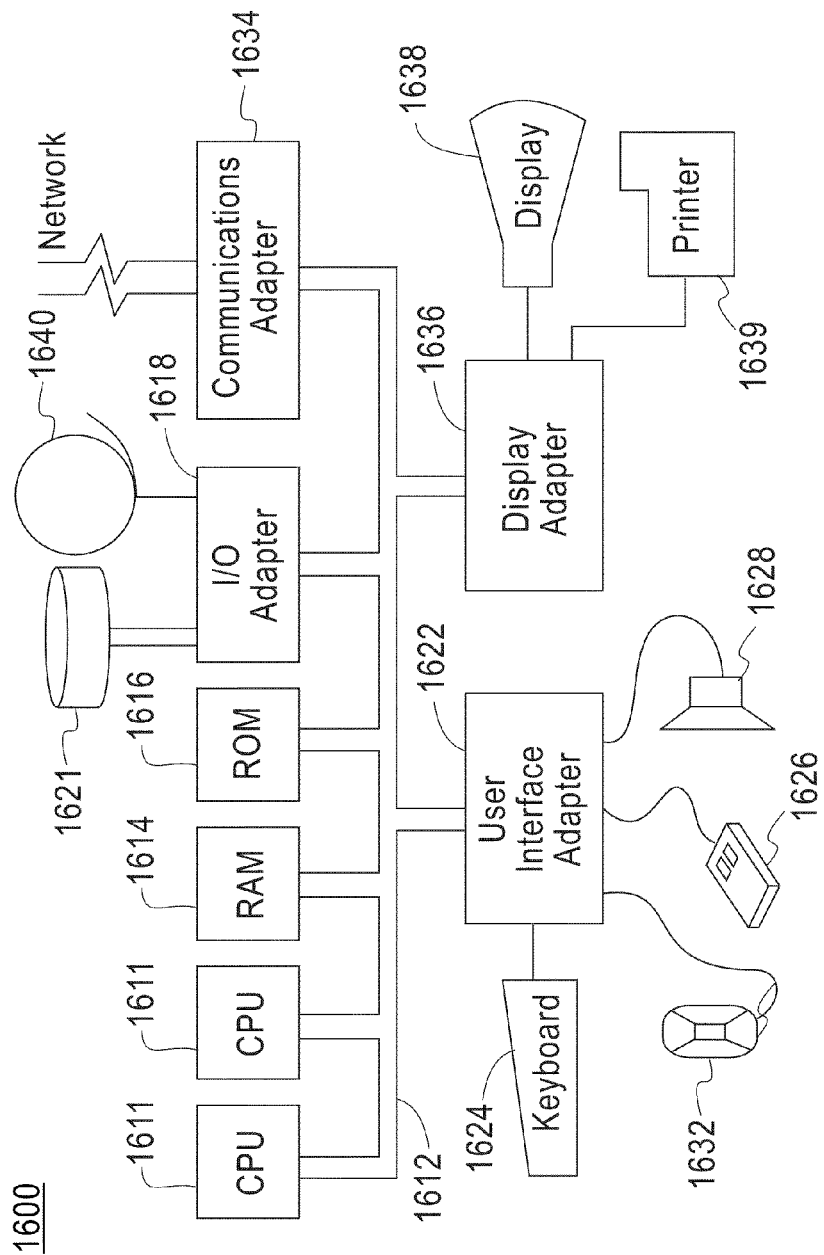
FIG. 6 illustrates an exemplary hardware configuration implementing one embodiment of the present invention.

FIG. 6 illustrates an exemplary hardware configuration for implementing the present invention according to one embodiment of the present invention. The hardware configuration preferably has at least one processor or central processing unit (CPU) 1611. The CPUs 1611 are interconnected via a system bus 1612 to a random access memory (RAM) 1614, read-only memory (ROM) 1616, input/output (I/O) adapter 1618 (for connecting peripheral devices such as disk units 1621 and tape drives 1640 to the bus 1612), user interface adapter 1622 (for connecting a keyboard 1624, mouse 1626, speaker 1628, microphone 1632, and/or other user interface device to the bus 1612), a communication adapter 1634 for connecting the system 1600 to a data processing network, the Internet, an Intranet, a personal area network (PAN), etc., and a display adapter 1636 for connecting the bus 1612 to a display device 1638 and/or printer 1639 (e.g., a digital printer of the like).

The present invention can be realized in hardware, software, or a combination of hardware and software. A typical combination of hardware and software could be a general purpose computer system with a computer program that, when being loaded and run, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions processed by the machine to perform method steps for causing one or more functions of this invention.

The present invention may be implemented as a computer readable medium (e.g., a compact disc, a magnetic disk, a hard disk, an optical disk, solid state drive, digital versatile disc) embodying program computer instructions (e.g., C, C++, Java, Assembly languages, .Net, Binary code) processed by a processor (e.g., Intel® Core™, IBM® PowerPC®) for causing a computer to perform method steps of this invention. The present invention may include a method of deploying a computer program product including a program of instructions in a computer readable medium for one or more functions of this invention, wherein, when the program of instructions is processed by a processor, the compute program product performs the one or more of functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A method of determining at least one location for a retail outlet in a market region comprising:
   partitioning the market region into a fixed number of sub-regions;
   computing marginal increments from input data for each of said sub-regions, wherein a local search algorithm is used to calculate a value of said marginal increment, said computing said marginal increments comprising:

for a sub-region $A_i$, denoting a maximal evaluation score by allocating k facilities in said sub-region as $f(A_i,k)$, said $f(A_i,k)$ being obtained by said local search algorithm;

for the sub-region $A_i$, defining a marginal increment having k outlet facilities as $d(A_i, k+1)=f(A_i, k+1)-f(A_i,k)$;

setting $m_1, m_2, \ldots, m_L$ to 0, where $m_1, m_2, \ldots, m_L$ denote the number of outlet facilities assigned to $A_1, A_2, \ldots, A_L$, computing a marginal increment $d(A_i, m_i+1)$ for each sub-region $A_i$;

obtaining a maximal marginal increment $d_{max}$ and a corresponding sub-region index $i_{max}$;

setting $m_{i_{max}}$ to $m_{i_{max}}+1$; and outputting said $m_1, m_2, \ldots, m_L$; and choosing a sub-region having a maximum value among the computed marginal increments for said at least one location of said retail outlet, wherein a processor device performs one or more of: said partitioning, said computing and said choosing.

2. The method of claim 1 further comprising:
repeating said computing and choosing to select another location of said retail outlet.

3. The method of claim 1 wherein said input data comprises one or more of:
geographical data, customer demand estimation and outlet facility property.

4. The method of claim 1 wherein said fixed number of sub-regions is defined by one of more of: physical barriers, customer behaviors and customer distributions.

5. The method of claim 4 wherein said physical barriers are stored on a Geography Information System platform.

6. The method of claim 1 wherein said local search algorithm is one or more: Tabu search, Greedy adding and Enumeration.

7. The method of claim 1 wherein, a sub-region that contains minimal outlet facilities is selected to accommodate a new facility if there is more than one marginal increment that equals to said $d_{max}$.

8. A computer system of determining at least one location for a retail outlet in a market region comprising:
a memory;
a processor unit in communications with the computer memory, wherein the processor unit is configured to perform operations according to a method comprising:
partitioning the market region into a fixed number of sub-regions;
computing marginal increments from input data for each of said sub-regions, wherein a local search algorithm is used to calculate a value of said marginal increment, said computing said marginal increments comprising:
for a sub-region $A_i$, denoting a maximal evaluation score by allocating k facilities in said sub-region as $f(A_i,k)$, said $f(A_i,k)$ being obtained by said local search algorithm;
for the sub-region $A_i$, defining a marginal increment having k outlet facilities as $d(A_i, k+1)=f(A_i, k+1)-f(A_i,k)$;
setting $m_1, m_2, \ldots, m_L$ to 0, where $m_1, m_2, \ldots, m_L$ denote the number of outlet facilities assigned to $A_1, A_2, \ldots, A_L$,
computing a marginal increment $d(A_i, m_i+1)$ for each sub-region $A_i$;
obtaining a maximal marginal increment $d_{max}$ and a corresponding sub-region index $i_{max}$;
setting $m_{i_{max}}$ to $m_{i_{max}}+1$; and
outputting said $m_1, m_2, \ldots, m_L$; and
choosing a sub-region having a maximum value among the computed marginal increments for said at least one location of said retail outlet.

9. The computer system of claim 8 wherein said processor unit is further configured to perform:
repeating computing of said marginal increments and said choosing to select another location of said retail outlet.

10. The computer system of claim 8 wherein said input data comprises one or more of: geographical data, customer demand estimation and outlet facility property.

11. The computer system of claim 8 wherein said fixed number of sub-regions is defined by one of more of: physical barriers, customer behaviors and customer distributions.

12. The computer system of claim 11 wherein said physical barriers are stored on a Geography Information System platform.

13. The computer system of claim 8 wherein said local search algorithm is one or more: Tabu search, Greedy adding and Enumeration.

14. The computer system of claim 8 wherein, a sub-region that contains minimal outlet facilities is selected to accommodate a new facility if there is more than one marginal increment that equals to said $d_{max}$.

15. A computer readable medium embodying computer program instructions being processed by a processor for causing a computer to perform method steps for determining at least one location for a retail outlet in a market region compressing an input data stream, said method steps comprising
partitioning the market region into a fixed number of sub-regions;
computing marginal increments from input data for each of said sub-regions, wherein a local search algorithm is used to calculate a value of said marginal increment, said computing said marginal increments comprising:
for a sub-region $A_i$, denoting a maximal evaluation score by allocating k facilities in said sub-region as $f(A_i,k)$, said $f(A_i,k)$ being obtained by said local search algorithm;
for the sub-region $A_i$, defining a marginal increment having k outlet facilities as $d(A_i, k+1)=f(A_i, k+1)-f(A_i,k)$;
setting $m_1, m_2, \ldots, m_L$ to 0, where $m_1, m_2, \ldots, m_L$ denote the number of outlet facilities assigned to $A_1, A_2, \ldots, A_L$,
computing a marginal increment $d(A_i, m_i+1)$ for each sub-region $A_i$;
obtaining a maximal marginal increment $d_{max}$ and a corresponding sub-region index $i_{max}$;
setting $m_{i_{max}}$ to $m_{i_{max}}+1$; and
outputting said $m_1, m_2, \ldots, m_L$; and
choosing a sub-region having a maximum value among the computed marginal increments for said at least one location of said retail outlet.

16. A method of deploying a computer program product including programs of instructions in a computer readable medium for compressing an input data stream, wherein, when the programs of instructions are processed by at least one processor, the computer program product performs the steps of:
partitioning the market region into a fixed number of sub-regions;
computing marginal increments from input data for each of said sub-regions, wherein a local search algorithm is used to calculate a value of said marginal increment, said computing said marginal increments comprising:
for a sub-region $A_i$, denoting a maximal evaluation score by allocating k facilities in said sub-region as $f(A_i,k)$, said $f(A_i,k)$ being obtained by said local search algorithm;

for the sub-region $A_i$, defining a marginal increment having k outlet facilities as $d(A_i, k+1)=f(A_i, k+1)-f(A_i,k)$;

setting $m_1, m_2, \ldots, m_L$ to 0, where $m_1, m_2, \ldots, m_L$ denote the number of outlet facilities assigned to $A_1, A_2, \ldots, A_L$, computing a marginal increment $d(A_i, m_i+1)$ for each sub-region $A_i$;

obtaining a maximal marginal increment $d_{max}$ and a corresponding sub-region index $i_{max}$;

setting $m_{i_{max}}$ to $m_{i_{max}}+1$; and outputting said $m_1, m_2, \ldots, m_L$; and choosing a sub-region having a maximum value among the computed marginal increments for said at least one location of said retail outlet.

* * * * *